Patented Jan. 5, 1937

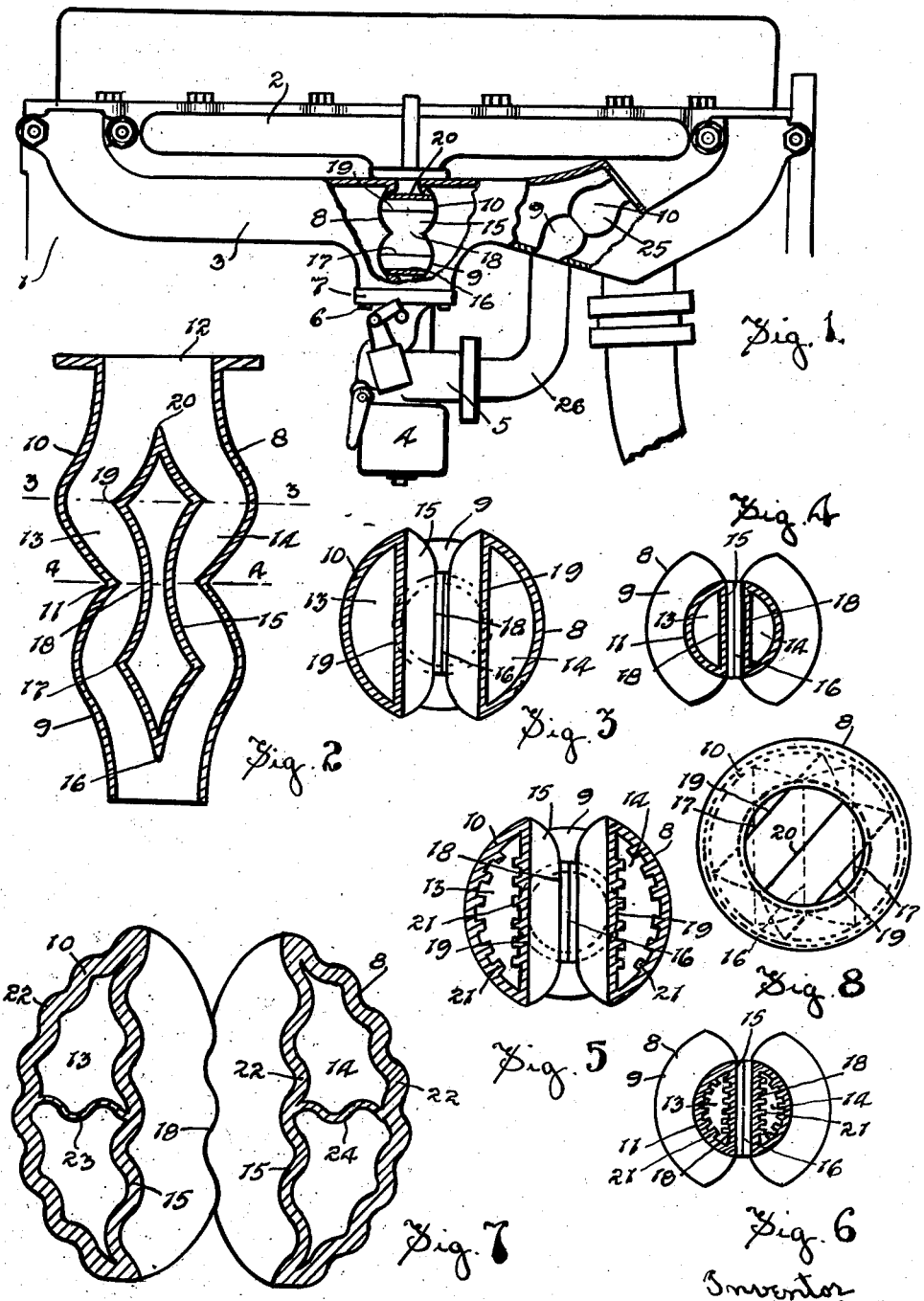
Jan. 5, 1937. W. H. DUTHOIT 2,066,720
PREHEATER AND FIRING MIXTURE GASIFIER
Filed March 18, 1935

2,066,720

UNITED STATES PATENT OFFICE 2,066,720

PREHEATER AND FIRING MIXTURE GASIFIER

William H. Duthoit, Winnipeg, Manitoba, Canada

Application March 18, 1935, Serial No. 11,591

3 Claims. (Cl. 261—12)

The invention relates to pre-heaters and firing mixture gasifiers and a general object of the invention is to provide a device particularly for use on an internal combustion engine, such as an automobile engine, and which will pre-heat the air passing to the carburetor and will also serve to effectively mix and gasify the firing mixture passing from the carburetor to the intake manifold, thereby rendering it particularly effective for firing purposes in the engine cylinders.

A further object is to design the device so that the firing mixture is given a serpentine passage therethrough, the walls of the passage being so shaped that the passing mixture is effectively broken up and mixed, the flow is not retarded and there is no tendency to the formation of voids or vacuums in the passage.

A further object is to position the device so that the firing mixture passing therethrough is subjected to the heat of the exhaust gases, and such that by its structural design there is a maximum heating area provided to insure of the effective gasifying of the firing mixture.

A further object is to construct the device so that it can be readily installed in the existing intake manifold without requiring any material alterations to be made and such also that it can be made at comparatively small cost.

With the above more important objects in view the invention consists essentially in the arrangement and construction of parts, hereinafter described, reference being had to the accompanying drawing, in which Fig. 1 is a side view of the upper portion of an internal combustion engine equipped with my invention, certain parts being torn away and other parts being in vertical section.

Fig. 2 is an enlarged vertical sectional view through the conduit.

Fig. 3 is a horizontal sectional view at 3—3 Fig. 1.

Fig. 4 is a horizontal sectional view at 4—4 Fig. 1.

Fig. 5 is a horizontal sectional view similar to Fig. 3, and showing the conduit passages as supplied with vertical ribs.

Fig. 6 is a horizontal sectional view similar to Fig. 4, and showing the ribs in the passages.

Fig. 7 is an enlarged horizontal sectional view through the conduit and showing the walls as corrugated vertically and the passages as divided by vertical partitions.

Fig. 8 is a plan view of the conduit and showing a modified arrangement of the tube passing therethrough.

In the drawing like characters of reference indicate corresponding parts in the several figures.

The internal combustion engine 1 is provided with the customary inlet manifold 2, exhaust manifold 3 and carburetor 4, the inlet manifold in the present instance being shown as positioned directly above the exhaust manifold as is common practice.

The carburetor is supplied with the usual air inlet 5 and has the upper end thereof fastened by bolts 6 through the flange 7 to the exhaust manifold.

In equipping an engine with my invention, I provide a conduit 8 which passes vertically and centrally through the exhaust manifold and has its ends suitably permanently fastened to the top and bottom walls of the said manifold. The lower end of the conduit communicates with the upper end of the carburetor and the upper end thereof opens to the intake manifold so that the firing mixture is passed from the carburetor to the intake manifold through the conduit, which latter it will be observed is located within the exhaust manifold and is accordingly subjected to the heat of the exhaust gases.

The lower part 9 of the conduit is bulbous in form as is also the upper part 10 and at their points of union a contracted neck 11 is formed, the cross sectional area of the neck being approximately equal to the cross sectional area of the lower or inlet end of the conduit. The upper bulb 10 is somewhat larger than the lower one 9 and the outlet 12 therefrom is of greater cross sectional area than at the neck.

The conduit is divided into similar passages 13 and 14 by a centrally located cross tube or pipe 15 for exhaust gases, which extends through the neck and into the bulbs. It will be observed that the walls of the tube are flared or curved, first outwardly from a meeting point 16 adjacent the lower end of the conduit, to a point 17 centrally within the lower bulb, then inwardly to a central contracted portion 18 within the neck, then outwardly to a point 19 centrally within the upper bulb and then inwardly to a meeting point 20 adjacent the upper end of the conduit.

By constructing the conduit and the tube in the manner described I obtain passages 13 and 14 which are extremely effective in breaking up and mixing the firing mixture and which do not retard the flow and do not cause voids in the passages, and further the walls of the passages are of relatively large area, so that the passing mixture is effectively gasified by the heat of the surrounding exhaust gases. In actual tests I have found that the device functions very effectively as a fuel saver at all engine speeds and insures of a smooth running engine.

In Figs. 2, 3 and 4 I have shown the device in its simplest form, the walls being all smooth. In Figs. 5 and 6 I have shown the walls of the passages as provided with vertical ribs 21 and in Fig. 7 I have shown the walls of the passages as supplied with vertical corrugations 22 and the passages as divided by vertical centrally located corrugated partitions 23 and 24. These modified forms give increased heating areas for the exhaust gases as will be readily understood.

It is also possible to spiral the passages 13 and 14, this being accomplished by longitudinally twisting the tube or pipe 15 so that its upper end will be contained in a vertical plane positioned, say one eighth turn, from the vertical plane containing the lower end of the tube. A tube so twisted is shown in Fig. 8. This arrangement gives a longer flow through the conduit and may possibly aid in more thoroughly mixing the passing mixture.

I provide in the exhaust manifold a further conduit 25 constructed the same as that hereinbefore described. The lower end of the conduit 25 communicates through the pipe 26 with the air inlet pipe 5 of the carburetor. The upper end of the conduit 25 opens to atmospheric air and accordingly the air fed to the carburetor is pre-heated before being admitted, the pre-heating being done by the exhaust gases passing through the exhaust manifold to the exhaust pipe 27.

What I claim as my invention is:—

1. The combination with the carburetor and the intake and exhaust manifolds of an internal combustion engine, of a conduit passing through the exhaust manifold and connecting the carburetor with the intake manifold, said conduit presenting upper and lower bulbous portions connected by a contracted neck and a passage for exhaust gases crossing the conduit and extending centrally through the neck and forming with the walls of the conduit, serpentine passages for the firing mixture passing from the carburetor to the intake manifold.

2. The combination with the carburetor and the intake and exhaust manifolds of an internal combustion engine, of a conduit passing through the exhaust manifold and connecting the carburetor with the intake manifold, said conduit presenting upper and lower bulbous portions connected by a contracted neck, a tube for exhaust gases, transversely crossing the conduit and passing centrally through the neck and extending into the bulbous portions aforesaid, the walls of the tube flaring outwardly, above and below the neck to points centrally of the bulbous portions and inwardly thereafter to points within the upper and lower ends of the conduit.

3. The combination with the carburetor and the intake and exhaust manifolds of an internal combustion engine, of a conduit passing through the exhaust manifold and connecting the intake manifold with the carburetor, said conduit having contracted upper, lower and intermediate portions and a passage for exhaust gases centrally crossing the conduit and forming with the conduit serpentine vertical, spiralling passages for the firing mixture passing from the carburetor to the intake manifold.

WILLIAM H. DUTHOIT.